(12) United States Patent
Moore et al.

(10) Patent No.: US 9,248,800 B1
(45) Date of Patent: Feb. 2, 2016

(54) SIDE PILLAR ASSEMBLIES WITH RETENTION STRUCTURES FOR SIDE AIRBAGS (71) Applicant: Toyota Motor Engineering & Manufacturing North America, Inc., Erlanger, KY (US)

(72) Inventors: Jaime N. Moore, Ann Arbor, MI (US); Daniel F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/497,738

(22) Filed: Sep. 26, 2014

(51) Int. Cl.
*B60R 21/213* (2011.01)
*B60R 21/232* (2011.01)
*B60R 21/231* (2011.01)
*B60R 21/00* (2006.01)

(52) U.S. Cl.
CPC ............. *B60R 21/213* (2013.01); *B60R 21/232* (2013.01); *B60R 21/23138* (2013.01); *B60R 2021/0048* (2013.01)

(58) Field of Classification Search
CPC ................ B60R 21/213; B60R 21/232; B60R 21/23138; B60R 2021/0048
See application file for complete search history.

(56) References Cited

U.S. PATENT DOCUMENTS

| | | | |
|---|---|---|---|
| 6,254,123 B1 | 7/2001 | Urushi et al. | |
| 6,305,707 B1* | 10/2001 | Ishiyama et al. | 280/728.2 |
| 6,485,049 B1* | 11/2002 | Prottengeier et al. | 280/730.2 |
| 6,672,027 B2 | 1/2004 | Mizutani et al. | |
| 6,796,576 B2* | 9/2004 | Aoki et al. | 280/730.2 |
| 6,843,502 B2* | 1/2005 | Aoki et al. | 280/730.2 |
| 7,011,337 B2* | 3/2006 | Aoki et al. | 280/730.2 |
| 7,121,579 B2* | 10/2006 | Ochiai et al. | 280/730.2 |
| 7,134,682 B2* | 11/2006 | Totsuka et al. | 280/728.2 |
| 7,172,211 B2* | 2/2007 | Hirose | 280/730.2 |
| 7,246,817 B2* | 7/2007 | Tanase | 280/730.2 |
| 7,273,228 B2* | 9/2007 | Noguchi et al. | 280/730.2 |
| 7,578,521 B2* | 8/2009 | Downey et al. | 280/730.2 |
| 7,735,854 B2* | 6/2010 | Chang | 280/728.2 |
| 7,766,377 B2 | 8/2010 | Downey et al. | |
| 7,806,433 B2 | 10/2010 | Mitsuo et al. | |
| 7,810,838 B2* | 10/2010 | Iwayama et al. | 280/730.2 |
| 7,871,103 B2 | 1/2011 | Torii | |

(Continued)

FOREIGN PATENT DOCUMENTS

| | | | |
|---|---|---|---|
| JP | 2008230473 A | * | 10/2008 |
| JP | 2008296644 A | * | 12/2008 |
| JP | 2011162044 A | * | 8/2011 |

*Primary Examiner* — Laura Freedman
(74) *Attorney, Agent, or Firm* — Dinsmore & Shohl LLP (57) ABSTRACT

A vehicle includes a B-pillar garnish mounted at a side pillar assembly of the vehicle. The B-pillar garnish includes an airbag jump bracket engaging feature including a hook-shaped engaging portion extending upwardly beyond an end of an outwardly turned flange portion of the airbag jump bracket. The hook-shaped engaging portion includes a stem portion and an enlarged head portion that overhangs the end of the outwardly turned flange portion of the airbag jump bracket that engages the outwardly turned flange portion during an airbag deployment event. The stem portion is located adjacent the end of the outwardly turned flange portion of the airbag jump bracket. The stem portion is arranged to engage the end of the outwardly turned flange portion of the airbag jump bracket to limit movement of an upper end portion of the B-pillar garnish into the occupant compartment of the vehicle.

20 Claims, 5 Drawing Sheets

(56) References Cited

U.S. PATENT DOCUMENTS

| | | | |
|---|---|---|---|
| 7,934,748 B2* | 5/2011 | Torii | 280/730.2 |
| 7,963,551 B2* | 6/2011 | Matsuoka et al. | 280/730.2 |
| 8,434,782 B2 | 5/2013 | Asano | |
| 8,702,124 B2* | 4/2014 | Williams et al. | 280/730.2 |
| 2004/0227334 A1* | 11/2004 | Chausset | 280/730.2 |
| 2006/0082108 A1* | 4/2006 | Wahara et al. | 280/730.2 |

* cited by examiner

SIDE PILLAR ASSEMBLIES WITH RETENTION STRUCTURES FOR SIDE AIRBAGS

TECHNICAL FIELD

The present specification generally relates to side pillar assemblies in vehicles and, more particularly, to a side pillar assembly and retention structures for side airbags.

BACKGROUND

Side airbag apparatuses have been proposed in which an airbag is accommodated in a folded state at a roof side rail portion at a B pillar portion, behind a roof head lining. During deployment, the airbag can release into the vehicle compartment between the roof head lining and a B pillar garnish. While it can be important to provide such an airbag release location between the roof head lining and B pillar garnish, it can be undesirable for the B pillar garnish to sag apart from the roof head lining. Such sagging can result in a visual gap between the head lining and B pillar garnish. What is desired is a retention structure that can hold the B pillar garnish in place, even during an airbag deployment.

SUMMARY

In one embodiment, a vehicle includes a B-pillar garnish mounted at a side pillar assembly of the vehicle. The B-pillar garnish has an upper end portion. A roof head lining has an outer portion that extends along the upper end portion of the B-pillar garnish. An airbag jump bracket is fixedly located between the B-pillar body and the roof head lining. The airbag jump bracket includes a first portion extending in a vehicle height direction and a second portion extending outwardly from the first portion in a vehicle width direction. The second portion supports an airbag body that guides the airbag body toward an occupant compartment of the vehicle during an airbag deployment event. The airbag jump bracket further includes an outwardly turned flange portion extending outwardly in the vehicle width direction to underhang the second portion of the airbag jump bracket. The outwardly turned flange portion terminates at an end located beneath the second portion of the airbag jump bracket. The B-pillar garnish includes an airbag jump bracket engaging feature including a hook-shaped engaging portion extending upwardly beyond the end of the outwardly turned flange portion of the airbag jump bracket. The hook-shaped engaging portion includes a stem portion and an enlarged head portion that overhangs the end of the outwardly turned flange portion of the airbag jump bracket that engages the outwardly turned flange portion during an airbag deployment event. The stem portion is located adjacent the end of the outwardly turned flange portion of the airbag jump bracket. The stem portion is arranged to engage the end of the outwardly turned flange portion of the airbag jump bracket to limit movement of the upper end portion of the B-pillar garnish into the occupant compartment of the vehicle.

In another embodiment, a vehicle includes a B-pillar garnish mounted at a side pillar assembly of the vehicle. The B-pillar garnish has an upper end portion. A roof head lining has an outer portion that extends along the upper end portion of the B-pillar garnish. An airbag jump bracket is fixedly located between the B-pillar body and the roof head lining. The airbag jump bracket includes a first portion extending in a vehicle height direction and a second portion extending outwardly from the first portion in a vehicle width direction. The second portion supports an airbag body that guides the airbag body toward an occupant compartment of the vehicle during an airbag deployment event. The airbag jump bracket further includes an outwardly turned flange portion extending outwardly in the vehicle width direction to underhang the second portion of the airbag jump bracket. The outwardly turned flange portion terminates at an end located beneath the second portion of the airbag jump bracket. The B-pillar garnish includes an airbag jump bracket engaging feature including a hook-shaped engaging portion extending upwardly beyond the end of the outwardly turned flange portion of the airbag jump bracket. The hook-shaped engaging portion includes a stem portion spaced from the end of the outwardly turned flange portion no more than about 3 cm and an enlarged head portion that overhangs the end of the outwardly turned flange portion and is spaced from the end of the outwardly turned flange portion no more than about 3 cm.

In another embodiment, a mounting structure for use with an airbag body in a vehicle. The vehicle includes a vehicle compartment, a roof side rail and a B-pillar assembly. The airbag body is inflatable along the roof side rail and across the B pillar. The mounting structure includes a B-pillar garnish having an upper end portion. An airbag jump bracket includes a first portion extending upwardly and a second portion extending outwardly from the first portion. The second portion is configured to support the airbag body and guide the airbag body toward an occupant compartment of the vehicle during an airbag deployment event. The airbag jump bracket further includes an outwardly turned flange portion extending outwardly to underhang the second portion of the airbag jump bracket. The outwardly turned flange portion terminates at an end located beneath the second portion of the airbag jump bracket. The B-pillar garnish includes an airbag jump bracket engaging feature including a hook-shaped engaging portion extending upwardly beyond the end of the outwardly turned flange portion of the airbag jump bracket. The hook-shaped engaging portion includes a stem portion and an enlarged head portion configured to overhang the end of the outwardly turned flange portion of the airbag jump bracket that engages the outwardly turned flange portion during an airbag deployment event. The stem portion is configured to engage the end of the outwardly turned flange portion of the airbag jump bracket to limit movement of the upper end portion of the B-pillar garnish into the occupant compartment of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to side pillar assemblies and retention structures for use with side airbag apparatuses. The side airbag apparatuses include a side airbag that is located at the side pillar assembly, behind a roof head lining. The side airbag may be, for example, a curtain shield airbag (CSA) that may be deployed in response to one or more sensors detecting a side impact or rollover event. A jump bracket may be provided that supports the airbag thereon. The jump bracket may be sized and shaped not only to support the airbag, but also to provide some directional support for the airbag during a deployment event to guide the airbag toward the vehicle compartment in a predictable fashion. During deployment, the airbag can deploy from behind the roof head lining, above a B pillar garnish of the side pillar assembly and into the vehicle compartment. Because the airbag deploys in the vicinity of the B pillar garnish, it is desirable to control (e.g., limit) movement of the B pillar garnish during a deployment event. Additionally, it may be desirable to limit movement (e.g., sag) of the B pillar garnish away from the head lining, even during non-deployment of the airbag to prevent a gap forming between the head lining and the B pillar.

An arrow FR of the Figures indicates the forward direction of a vehicle, an arrow UP indicates the upward direction thereof and an arrow IN indicates the vehicle transverse inner direction.

Figure 1:
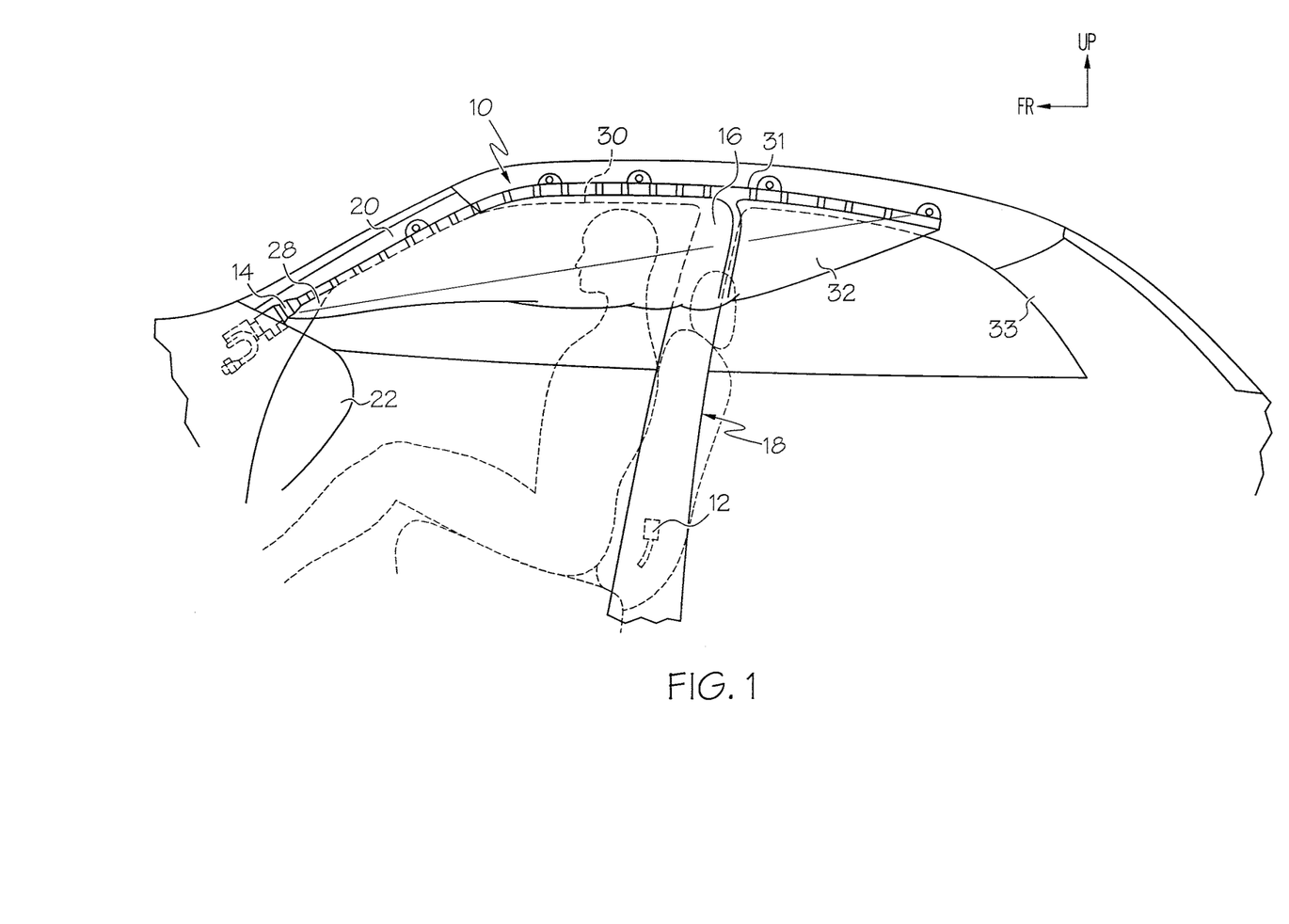
FIG. 1 is a schematic side view of a vehicle showing a state where an airbag body is deployed according to one or more embodiments described herein.

As shown in FIG. 1, a side airbag apparatus 10 comprises a sensor 12 for detecting a side collision and/or rollover event, a cylindrical inflator 14 which injects gas when it is activated, and an airbag body 16. The sensor 12 may be integrated in the airbag ECU and can be disposed near a bottom end portion of the B pillar (center pillar) 18 or any other suitable location to detect a side collision and/or rollover event when applied to the vehicle. In some embodiments, multiple sensors may be used at the same or different locations. The inflator 14 can be disposed near a joint portion between an A pillar (front pillar) 20 and a dashboard 22 and connected to the sensor 12. In other embodiments, the inflator may be located at the rear or C pillar of the vehicle or any other suitable location. If the sensor 12 detects a side collision and/or rollover event, the inflator 14 can be actuated to inflate the airbag body 16.

Figure 2:
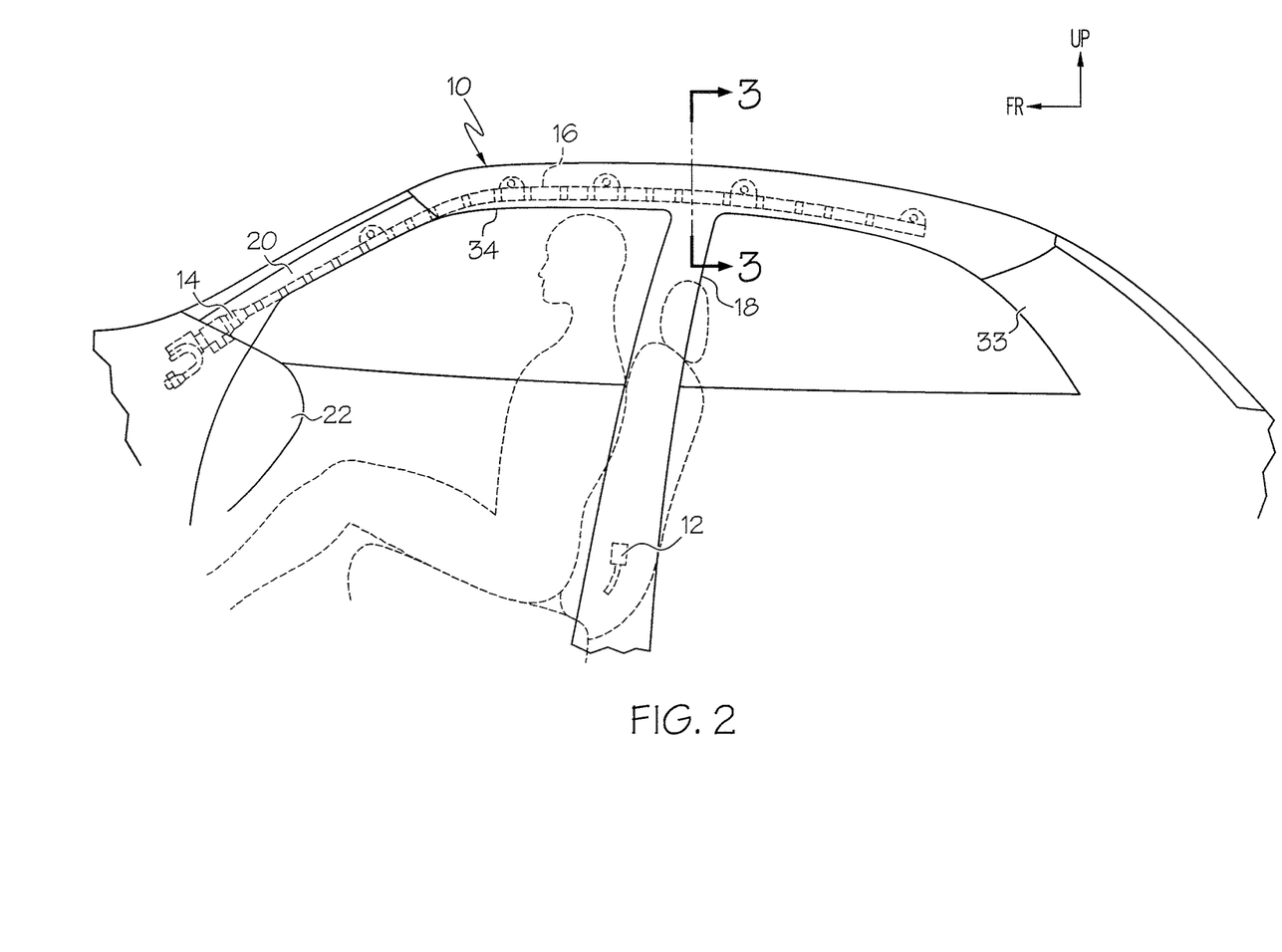
FIG. 2 is another schematic view of the vehicle of FIG. 1 with the airbag body is a stored configuration according to one or more embodiments described herein.

A front end portion 28 of the airbag body 16 may be disposed at a position where the inflator 14 is disposed such that gas injected from the inflator 14 flows therein. A top edge portion of a middle portion 30 of the airbag body 16 may be disposed along the B pillar 18 and a roof side rail 31. A rear end portion 32 may be disposed near a C pillar (quarter pillar) 33. As shown in FIG. 2, the airbag body 16 may be formed into an elongated, tube-like body by being folded, and may be accommodated over the A and B pillar garnishes and behind the roof head lining 34.

Figure 3:
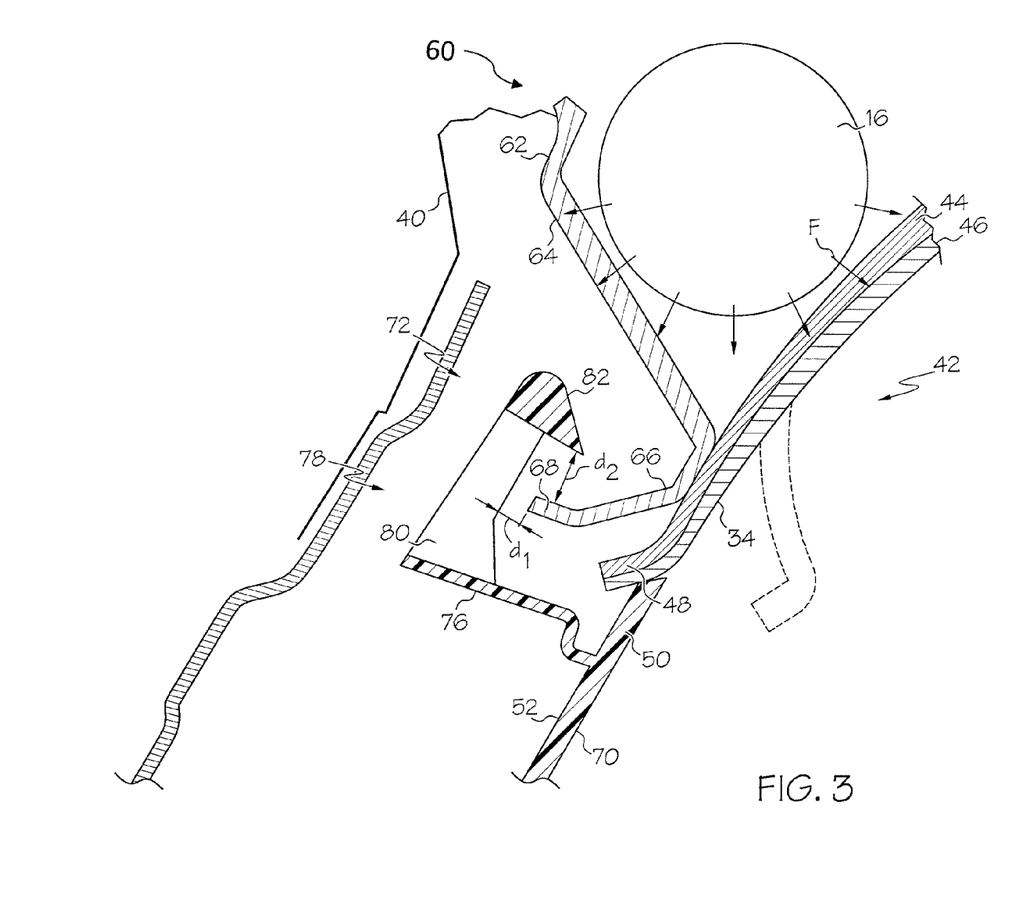
FIG. 3 is a schematic section view along line 3-3 of FIG. 2 according to one or more embodiments described herein.

Referring to FIG. 3, the airbag body 16 may be located between an inner rail panel 40 and a vehicle transverse outer portion 42 of the roof head lining 34. The roof head lining 34 may be made of resin and include a base material layer 44 and a surface skin layer 46. When the airbag body 16 inflates, the vehicle transverse outer portion 42 of the roof head lining 34 is opened inwards into the vehicle occupant compartment by an expanding inflation force of the airbag body 16 as indicated by dash line of FIG. 3 so that the airbag body 16 inflates in a vehicle occupant compartment inner direction through the gap thus formed. An edge portion 48 of the roof head lining 34 engages an upper end portion 50 of B pillar garnish 52. When the airbag body 16 is expanded, the engagement between the edge portion 48 of the roof head lining 34 and the upper end portion 50 of the B pillar garnish 52 is released by an inflation force of the airbag body 16.

An airbag jump bracket 60 is fixedly disposed as an airbag body directing structure below the airbag body 16. The jump bracket 60 may be formed of any suitable material, such as molded plastic or metal. The jump bracket 60 is located within a region above the B pillar garnish 52, between the head roof lining 34 and the inner rail panel 40 and includes a first portion 62 extending in the vehicle height direction and a second portion 64 extending outwardly from the first portion 62 in the vehicle width direction. In some embodiments, the first portion 62 may also bend around the airbag body 16 in the vehicle width direction. The second portion 64 supports the airbag body 16 thereon. The jump bracket 60 further includes an outwardly turned flange portion 66 extending outwardly in the vehicle width direction to underhang the second portion 64 of the jump bracket 60. The outwardly turned flange portion 66 terminates at an end 68 located beneath the second portion 64.

Figure 4:
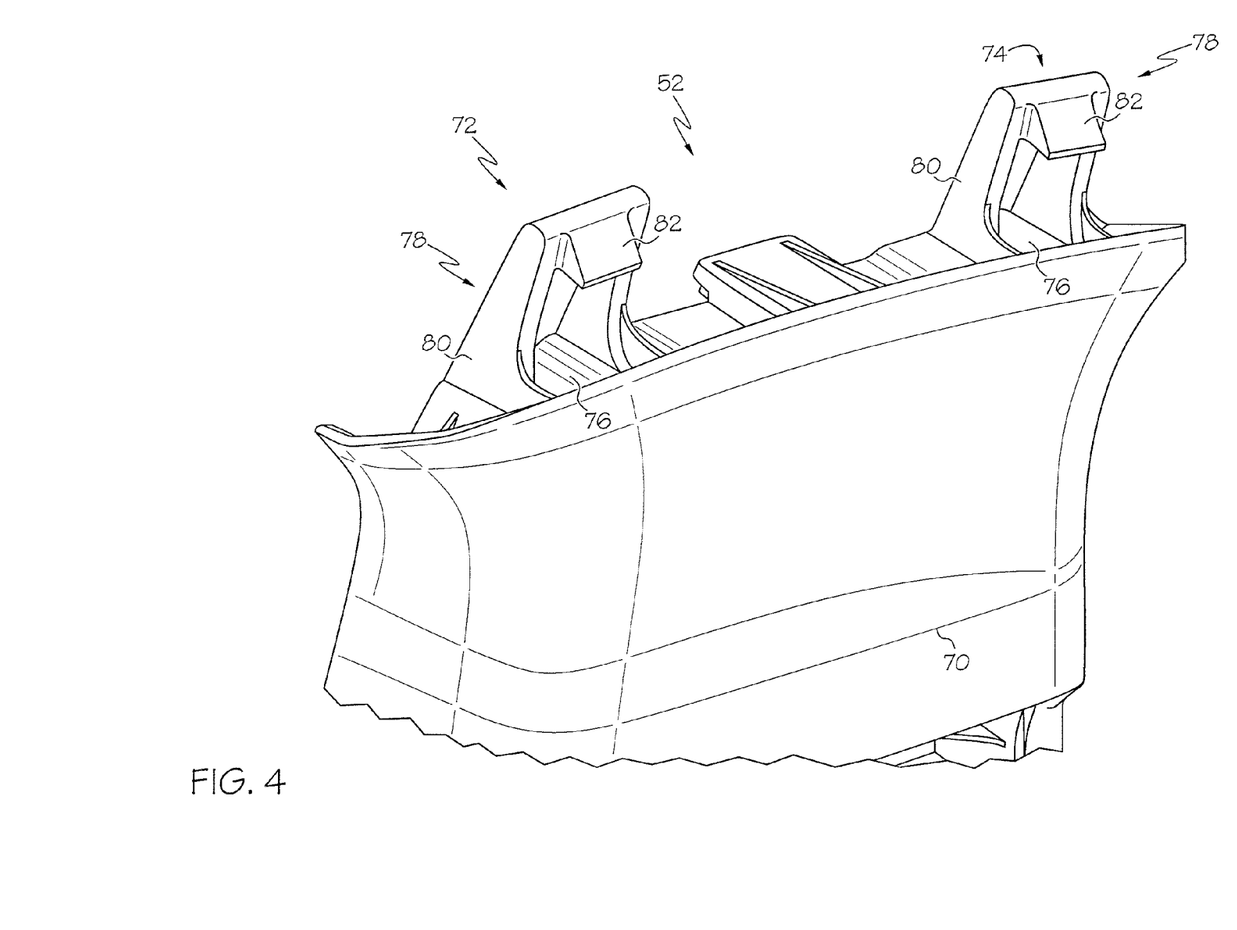
FIG. 4 is a front, perspective view of a B pillar garnish according to one or more embodiments described herein.

Referring also to FIG. 4, the B pillar garnish 52 may be made of plastic or any other suitable material and include multiple layers such as base material and skin layers. In some embodiments, a clip or other suitable structure may be used to fasten the B pillar garnish 52 to the inner rail panel 40 and/or to a center pillar panel (shown by dashed line). The B pillar garnish 52 includes a covering portion 70 that extends in the vehicle height direction and a pair of jump bracket engaging features 72 and 74 that are integrally molded with the covering portion 70 providing a unitary molded structure. Each jump bracket engaging feature 72, 74 includes a base portion 76 extending outwardly from the covering portion 70 in the vehicle width direction and a hook-shaped engaging portion 78 extending upwardly from the base portion 76.

Referring again to FIG. 3, the hook-shaped engaging portion 78 extends upwardly beyond the end 68 of the outwardly turned flange portion 66 of the jump bracket 60. The hook-shaped engaging portion 78 includes a stem portion 80 extending integrally from the base portion 76 and an enlarged head portion 82 that overhangs the end 68 of the outwardly turned flange portion 66 of the jump bracket 60. In some embodiments, the enlarged head portion 82 may not overhang the end 68 of the outwardly turned flange portion 66. The stem portion 80 and head portion 82 are sized and arranged to engage the outwardly turned flange portion 66 of the jump bracket 60 with small movements of the B pillar garnish 52 away from the jump bracket 60. However, some space is provided between the hook-shaped engaging portion 78 and the outwardly turned flange portion 66. For example, a distance $d_1$ from the stem portion 80 to the end 68 of the outwardly turned flange portion 66 may be no more than about 3 cm, such as no more than about 2 cm, such as no more than about 1 cm, such as no more than about 5 mm. A distance $d_2$ (which may be substantially orthogonal to distance d1) from the enlarged head portion 82 to the outwardly turned flange portion 66 may be no more than about 3 cm, such as no more than about 2 cm, such as no more than about 1 cm, such as no more than about 5 mm. Providing some spacing provided between the hook-shaped engaging portion 78 and the outwardly turned flange portion 66 can facilitate installation of the B pillar garnish 52 behind the jump bracket 60 and roof head lining 34 and also reduce noise due to the hook shaped engaging portion 78 and jump bracket 60 vibration.

Figure 5:
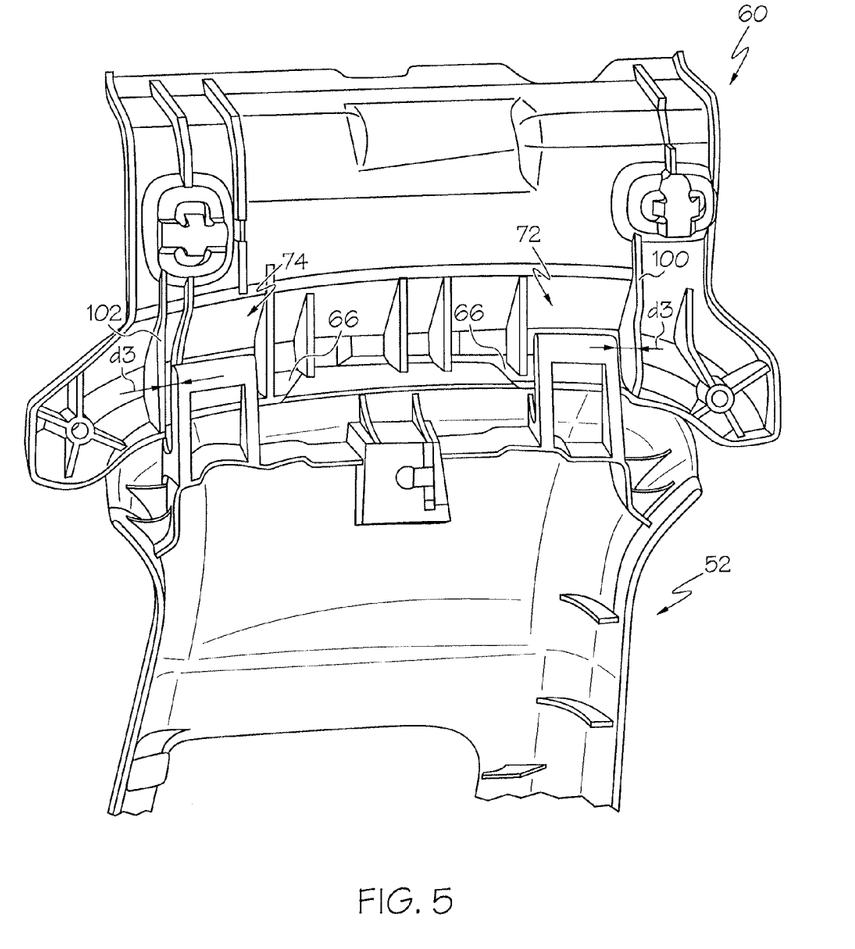
FIG. 5 is an exterior view of the B pillar garnish of FIG. 4 and airbag jump bracket according to one or more embodiments described herein.

FIG. 5 illustrates an exterior view of the B pillar garnish 52 assembled with the jump bracket 60. In this view, both jump bracket engaging features 72 and 74 can be seen along with the outwardly turned flange portion 66 of the jump bracket 60. It can be seen that the jump bracket engaging features 72 and 74 can also limit movement of the B pillar garnish 52 in the vehicle length direction. In this embodiment, distance $d_3$ between the jump bracket engaging features 72 and 74 and jump bracket support members 100 and 102 may be limited. For example, $d_3$ may be no more than about 3 cm, such as no more than about 2 cm, such as no more than about 1 cm, such as no more than about 5 mm.

The side pillar assemblies and retention structures for side airbags described herein can facilitate installation of the B pillar garnish while limiting its movement before and after an airbag deployment event. Limiting movement of the B pillar garnish before an airbag deployment event can reduce development of a visual gap between the B pillar garnish and the roof head lining. Limiting movement of the B pillar garnish during a deployment event can maintain the position of the B pillar garnish away from the deployment volume of the airbag body.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a B-pillar garnish mounted at a side pillar assembly of the vehicle, the B-pillar garnish having an upper end portion;
    a roof head lining having an outer portion that extends along the upper end portion of the B-pillar garnish; and
    an airbag jump bracket fixedly located between the B-pillar garnish and the roof head lining, the airbag jump bracket including a first portion extending in a vehicle height direction and a second portion extending outwardly from the first portion in a vehicle width direction, the second portion supporting an airbag body that guides the airbag body toward an occupant compartment of the vehicle during an airbag deployment event, the airbag jump bracket further comprising an outwardly turned flange portion extending outwardly in the vehicle width direction to underhang the second portion of the airbag jump bracket, the outwardly turned flange portion terminating at an end located beneath the second portion of the airbag jump bracket;
    the B-pillar garnish including an airbag jump bracket engaging feature including a hook-shaped engaging portion extending upwardly beyond the end of the outwardly turned flange portion of the airbag jump bracket, the hook-shaped engaging portion including a stem portion and an enlarged head portion that overhangs the end of the outwardly turned flange portion of the airbag jump bracket that engages the outwardly turned flange portion during an airbag deployment event;
    wherein the stem portion is located adjacent the end of the outwardly turned flange portion of the airbag jump bracket, the stem portion arranged to engage the end of the outwardly turned flange portion of the airbag jump bracket to limit movement of the upper end portion of the B-pillar garnish into the occupant compartment of the vehicle;
    wherein the enlarged head portion overhangs a gap between the stem portion and the end of the outwardly turned flange portion and the stem portion prevents passage of the end of the outwardly turned flange through the stem portion.

2. The vehicle of claim 1, wherein the B pillar garnish includes a cover portion and the airbag jump bracket engaging feature is integrally molded with the covering portion.

3. The vehicle of claim 2, wherein the airbag jump bracket engaging feature includes a base portion extending outwardly from the covering portion, the stem portion extending integrally from the base portion.

4. The vehicle of claim 1 comprising at least two airbag jump bracket engaging features including a hook-shaped engaging portion extending upwardly beyond the end of the outwardly turned flange portion of the airbag jump bracket.

5. The vehicle of claim 1, wherein the airbag jump bracket is formed of plastic.

6. The vehicle of claim 1, wherein the airbag body is a curtain shield airbag body.

7. The vehicle of claim 1, wherein the stem portion is spaced from the end of the outwardly turned flange portion no more than about 3 cm.

8. The vehicle of claim 1, wherein the enlarged head portion is spaced from the end of the outwardly turned flange portion no more than about 3 cm.

9. A vehicle comprising:
    a B-pillar garnish mounted at a side pillar assembly of the vehicle, the B-pillar garnish having an upper end portion;
    a roof head lining having an outer portion that extends along the upper end portion of the B-pillar garnish; and
    an airbag jump bracket fixedly located between the B-pillar garnish and the roof head lining, the airbag jump bracket including a first portion extending in a vehicle height direction and a second portion extending outwardly from the first portion in a vehicle width direction, the second portion supporting an airbag body that guides the airbag body toward an occupant compartment of the vehicle during an airbag deployment event, the airbag jump bracket further comprising an outwardly turned flange portion extending outwardly in the vehicle width direction to underhang the second portion of the airbag jump bracket, the outwardly turned flange portion terminating at an end located beneath the second portion of the airbag jump bracket;
    the B-pillar garnish including an airbag jump bracket engaging feature including a hook-shaped engaging portion extending upwardly beyond the end of the outwardly turned flange portion of the airbag jump bracket, the hook-shaped engaging portion including a stem portion spaced from the end of the outwardly turned flange portion no more than about 3 cm and an enlarged head portion that overhangs the end of the outwardly turned flange portion and is spaced from the end of the outwardly turned flange portion no more than about 3 cm;
    wherein the stem portion prevents passage of the end of the outwardly turned flange through the stem portion.

10. The vehicle of claim 9, wherein the stem portion is arranged to engage the end of the outwardly turned flange portion of the airbag jump bracket to limit movement of the upper end portion of the B-pillar garnish into the occupant compartment of the vehicle.

11. The vehicle of claim 9, wherein the enlarged head portion is arranged to engage the end of the outwardly turned flange portion of the airbag jump bracket to limit movement of the upper end portion of the B-pillar garnish into the occupant compartment of the vehicle.

12. The vehicle of claim 9, wherein the B pillar garnish includes a cover portion and the airbag jump bracket engaging feature is integrally molded with the covering portion.

13. The vehicle of claim 12, wherein the airbag jump bracket engaging feature includes a base portion extending outwardly from the covering portion, the stem portion extending integrally from the base portion.

14. The vehicle of claim 9 comprising at least two airbag jump bracket engaging features including a hook-shaped engaging portion extending upwardly beyond the end of the outwardly turned flange portion of the airbag jump bracket.

15. The vehicle of claim 9, wherein the airbag jump bracket is formed of plastic.

16. The vehicle of claim 9, wherein the airbag body is a curtain shield airbag body.

17. A mounting structure for use with an airbag body in a vehicle, the vehicle including a vehicle compartment, a roof side rail and a B-pillar assembly, wherein the airbag body is inflatable along the roof side rail and across the B pillar assembly, the mounting structure comprising:
- a B-pillar garnish having an upper end portion; and
- an airbag jump bracket including a first portion extending upwardly and a second portion extending outwardly from the first portion, the second portion configured to support the airbag body and guide the airbag body toward an occupant compartment of the vehicle during an airbag deployment event, the airbag jump bracket further comprising an outwardly turned flange portion extending outwardly to underhang the second portion of the airbag jump bracket, the outwardly turned flange portion terminating at an end located beneath the second portion of the airbag jump bracket;
- the B-pillar garnish including an airbag jump bracket engaging feature including a hook-shaped engaging portion extending upwardly beyond the end of the outwardly turned flange portion of the airbag jump bracket, the hook-shaped engaging portion including a stem portion and an enlarged head portion configured to overhang the end of the outwardly turned flange portion of the airbag jump bracket that engages the outwardly turned flange portion during an airbag deployment event;
- wherein the stem portion is configured to engage the end of the outwardly turned flange portion of the airbag jump bracket to limit movement of the upper end portion of the B-pillar garnish into the occupant compartment of the vehicle;
- wherein the enlarged head portion overhangs a gap between the stem portion and the end of the outwardly turned flange portion and the stem portion prevents passage of the end of the outwardly turned flange through the stem portion.

18. The mounting structure of claim 17, wherein the B pillar garnish includes a cover portion and the airbag jump bracket engaging feature is integrally molded with the covering portion.

19. The mounting structure of claim 18, wherein the airbag jump bracket engaging feature includes a base portion extending outwardly from the covering portion, the stem portion extending integrally from the base portion.

20. The mounting structure of claim 17 comprising at least two airbag jump bracket engaging features including a hook-shaped engaging portion.

* * * * *